Patented Feb. 9, 1943

2,310,568

UNITED STATES PATENT OFFICE 2,310,568

METHOD OF JOINING MATERIALS

Zed J. Atlee, Elmhurst, and Howard Brackney, Chicago, Ill., assignors to General Electric X-Ray Corporation, Chicago, Ill., a corporation of New York No Drawing. Original application January 8, 1941, Serial No. 373,630. Divided and this application June 6, 1941, Serial No. 396,866

14 Claims. (Cl. 113—112)

This invention relates in general to brazing and soldering and has more particular reference to a new and improved method and means for securing beryllium to other metals, the invention comprising subject-matter divided from my co-pending application, Serial No. 373,630, filed January 8, 1941.

An important object of the invention is to provide means for brazing a readily soluble metal, such as beryllium, to unite the same with difficultly soluble metals.

Another important object of the invention is to provide for producing vacuum-tight joints between beryllium and other metals.

Another important object is to provide an improved brazing medium or solder particularly well suited for brazing readily soluble metals such as beryllium.

Beryllium is especially well suited for use as window-pane material in X-ray generators since the material is substantially transparent to X-rays. Beryllium, however, is readily soluble and is characterized by a tendency to go into solution rapidly with usual brazing or soldering media. We have discovered, however, that an alloy of a metal which has a tendency to form solutions with beryllium rapidly, and a metal which has a tendency to form solutions with beryllium more slowly, may be employed in order to form vacuum-tight joints between beryllium and other metals, as, for example, cold rolled steel.

In accordance with a preferred embodiment of the invention, we have found that a special alloy, containing silver and copper, will form a vacuum-tight joint between a beryllium disk and a steel bushing when the brazing is done in a hydrogen furnace and calcium chloride is used as a flux. This particular alloy, which represents a preferred embodiment of the invention, has the necessary properties of wetting the beryllium but yet not going into full solution with it before a satisfactory joint is formed. In order that an alloy may flow evenly over the surface of the beryllium to form a joint, it must be in a highly molten state. But the higher the temperature, the faster is the rate at which beryllium will go into solution with metals or alloys with which it has any tendency at all to form solutions. For example, pure copper, in the molten state, goes into solution very rapidly with beryllium. On the other hand, pure silver, in the molten state, goes into solution with beryllium very slowly. Alloys of copper and silver have intermediate rates of solution. Moreover, all alloys of copper and silver have melting points lower than that of pure copper. All alloys having less than about 15% of copper have melting points lower than that of pure silver. Therefore, alloys of copper and silver have the added advantage that they can be used at lower temperatures, which possibility adds further to the control of the rate of solution with beryllium. For the purpose of the present invention, it is preferable that the relative amounts of copper present in the alloy of a copper and silver be greater than the relative amount of copper present in its eutectic composition. The eutectic composition consists of 72% silver and 28% copper.

In actual practice, the vacuum-tight joints which are obtained with the alloy containing 50% silver and 50% copper go into solution over the soldered portions of the surface of the beryllium member to a depth of only a few thousandths of an inch.

The thickness of the beryllium member may vary, but good results have been obtained by employing a member having a thickness from about $\frac{1}{32}$ to about $\frac{1}{16}$ of an inch. It will be understood, of course, that the invention is not limited specifically to the use of alloys of silver and copper containing 50% of each ingredient, nor is it specifically limited to alloys containing only silver or copper, although it is preferable, for the purpose of the present invention, that the alloy be one which is molten at a temperature within the range from 700° centigrade to 900° centigrade.

In making vacuum tubes, and particularly in making X-ray generators, the use of alloys for brazing which have a melting point greater than about 900° centigrade is undesirable because of the possibility of cracking or checking parts of the tube, and also because the higher the temperature, the greater is the possibility of the alloy going into solution with the beryllium. If this occurs, the window of the X-ray tube would no longer be substantially pure beryllium, consequently it would absorb a greater amount of the X-rays generated and one of the advantages of the invention would be lost. Furthermore, if higher temperatures are employed in the brazing operation, the temperature more nearly approaches the melting point of beryllium, which is around 1283° centigrade.

It will be understood, of course, that the method of the present invention is applicable to any brazing or joining operation in which a joint is formed between beryllium and some other metal, as, for example, steel.

It is thought that the invention and its nuverous attendant advantages will be fully understood from the foregoing description, and it is obvious that numerous changes may be made in the process without departing from the spirit or scope of the invention, or sacrificing any of its attendant advantages, the form herein disclosed being a preferred embodiment for the purpose of demonstrating the invention.

The invention is hereby claimed as follows:

1. The method of joining a beryllium member to a base member of metal other than beryllium, which comprises forming a brazed metal joint between the members by melting, between the members, a brazing alloy comprising copper which, when molten, goes into solution relatively rapidly with beryllium, and silver which, when molten, goes into solution relatively slowly with beryllium.

2. The method of joining a beryllium member to a base member of metal other than beryllium, which comprises forming a brazed metal joint between the members by melting, between the members, a brazing alloy comprising copper which, when molten, goes into solution relatively rapidly with beryllium and silver which, when molten, goes into solution relatively slowly with beryllium, said alloy having a melting point above about 700° centigrade but below the melting point of beryllium.

3. The method of joining a beryllium member to a base member of metal other than beryllium, which comprises forming a brazed joint between the members by successively fusing and solidifying, between said members, brazing material comprising an alloy of copper and silver melting within the range of about 700° to about 900° centigrade.

4. The method of joining a beryllium member to a base member of metal other than beryllium, which comprises forming a brazed joint between the members by successively fusing and solidifying, between said members, a brazing material comprising an alloy of copper and silver, in which the relative amount of copper is substantially greater than the amount of copper present in the eutectic composition of said alloy.

5. The method of joining a beryllium member to a base member of metal other than beryllium, which comprises forming a brazed joint between the members by successively fusing and solidifying, between said members, a brazing material comprising an alloy of copper and silver containing approximately equal amounts of each.

6. The method of joining a beryllium member to a base member of metal other than beryllium, which comprises brazing the members together by successively fusing and solidifying between said members, a brazing alloy composed of approximately 50% copper and 50% silver and a calcium chloride flux.

7. The method of joining a beryllium member to a base member of metal other than beryllium, which comprises forming a brazed joint between the members by successively fusing and solidifying, between the members, in a reducing atmosphere, a brazing material comprising an alloy of copper and silver.

8. The method of joining a beryllium member to a base member of metal other than beryllium, which comprises forming a brazed joint between the members by successively fusing and solidifying, between the members, in a reducing atmosphere, a brazing material comprising an alloy of copper and silver together with a fluxing medium.

9. The method of joining a beryllium member to a base member of metal other than beryllium, which comprises assembling the members in brazing position with a brazing material comprising an alloy of copper and silver having a melting temperature below the melting point of beryllium, and then heating the so assembled members to a temperature above the melting temperature of the brazing material but below the melting point of beryllium, while blanketing the members being brazed in a reducing atmosphere, and finally chilling the brazed members below the melting temperature of the brazing material before appreciable diffusion of any constituent of the brazing material can take place in the beryllium member.

10. The method of joining a beryllium member to a base member of metal other than beryllium, which comprises assembling the members in brazing position with a brazing material comprising an alloy of copper, which diffuses rapidly in beryllium, containing excess proportions of silver, which is less readily soluble with beryllium, and having a melting temperature below the melting point of beryllium, and then heating the so assembled members to a temperature above the melting temperature of the brazing material but below the melting point of beryllium, while blanketing the members being brazed in a reducing atmosphere, and finally chilling the brazed members below the melting temperature of the brazing material before appreciable diffusion of the copper constituent of the brazing material can take place in the beryllium member.

11. The method of joining a beryllium member to a base member of metal other than beryllium, which comprises assembling the members in brazing position with a brazing material comprising a wetting metal, capable of wetting beryllium and diffusing rapidly therein, together with another metal difficultly soluble in beryllium in quantities sufficient to prevent appreciable diffusion of the wetting metal during the brazing operation, and then heating the assembled members to a temperature below the melting point of beryllium but sufficiently high to fuse the brazing material, and finally chilling the brazed members before appreciable diffusion of the wetting metal can take place in the beryllium member.

12. The method of joining a beryllium member to a base member other than beryllium, which comprises forming a brazed metal joint between the members by melting, therebetween, in the presence of calcium chloride as a fluxing medium, a brazing alloy comprising copper which, when molten, goes into solution relatively rapidly with beryllium, and silver, which, when molten, goes into solution relatively slowly with beryllium.

13. The method of joining a beryllium member to a base member other than beryllium, which comprises forming a brazed metal joint between the members by successively fusing and solidifying, between said members and in the presence of calcium chloride as a fluxing medium, a brazing metal comprising an alloy of copper and silver, in which the relative amount of copper is substantially greater than the amount of copper present in the eutectic composition of said alloy.

14. The method of joining a beryllium member to a base member other than beryllium, which comprises forming a brazed joint between the members by successively fusing and solidifying, between the members and in the presence of calcium chloride as a fluxing medium, a brazing material comprising an alloy of copper and silver.

ZED J. ATLEE.
HOWARD BRACKNEY.